United States Patent [19]
Lazzari

[11] Patent Number: 5,476,804
[45] Date of Patent: Dec. 19, 1995

[54] PROCESS FOR PRODUCING A SEMICONDUCTOR FIELD DETECTOR MAGNETIC HEAD

[75] Inventor: Jean-Pierre Lazzari, Corenc, France

[73] Assignee: Silmag, Grenoble Cedex, France

[21] Appl. No.: 178,754

[22] Filed: Jan. 7, 1994

[30] Foreign Application Priority Data

Jan. 20, 1993 [FR] France ................... 93 00533

[51] Int. Cl.[6] .................. H01L 21/70; G11B 5/127
[52] U.S. Cl. ................. 437/51; 29/603; 360/126
[58] Field of Search ............... 360/126; 29/603; 437/51

[56] References Cited

U.S. PATENT DOCUMENTS

| | | |
|---|---|---|
| 3,800,193 | 3/1974 | Aswas et al. . |
| 4,837,924 | 6/1989 | Lazzari ................... 29/603 |
| 4,949,207 | 8/1990 | Lazzari ................... 360/126 |
| 5,090,111 | 2/1992 | Lazzari ................... 29/603 |
| 5,093,753 | 3/1992 | Friedrich et al. ........... 360/126 |
| 5,166,849 | 11/1992 | Fedeli ................... 360/125 |
| 5,168,408 | 12/1992 | Lazzari ................... 360/113 |
| 5,196,976 | 3/1993 | Lazzari ................... 360/126 |
| 5,208,716 | 5/1993 | Lazzari ................... 360/126 |

FOREIGN PATENT DOCUMENTS

| | | |
|---|---|---|
| 0443941 | 8/1991 | European Pat. Off. . |
| 2337239 | 3/1974 | Germany . |
| 56-143514 | 11/1981 | Japan . |
| 90-11597 | 10/1990 | WIPO . |
| 90/11594 | 10/1990 | WIPO . |

OTHER PUBLICATIONS

Baltes, H. P., et al., "Proc. of the IEEE", 74(1986) 1107 Integrated Semiconductor Magnetic Field Sensors.
Lenz, J. E., "Proc. of the IEEE", 78(1990) 973 A Review of Magnetic Sensors.
Popovic, R. S., "IEEE Electron Dev. Lett.", EDL-5 (1984) 357 The Vertical Hall Effect Device.
Taucamiya, S., et al., Ed-19(1972) 1085, Differential Amplification Magnetic Sensor.

Primary Examiner—Brian E. Hearn
Assistant Examiner—Leon Radomsky
Attorney, Agent, or Firm—Oblon, Spivak, McClelland, Maier & Neustadt

[57] ABSTRACT

Process for producing a semiconductor field detector magnetic head and head obtained by this process. On a silicon substrate (30) is produced a semiconductor sensor (32) and then the magnetic circuit of the head (36,48,50,52,54). Application to magnetic recording. (FIG. 2i)

17 Claims, 8 Drawing Sheets

PROCESS FOR PRODUCING A SEMICONDUCTOR FIELD DETECTOR MAGNETIC HEAD

DESCRIPTION

1. Technical Field.

The present invention relates to a semiconductor field detector magnetic head and to a head obtained by this process. The magnetic head according to the invention is either a read-only or a read and write head. It is used in magnetic recording, no matter whether the support is a tape, a hard disk, a floppy disk, etc.

2. Prior Art.

The magnetic head according to the invention is of the general type having a planar structure and with thin films or coatings. Such heads are known and are more particularly described in European patent applications EP-A-152,326 and EP-A-262,028 (or the corresponding US-A-4,837,924).

In order to increase the informations storage capacity on the tracks read by such heads, the width of the tracks is reduced. There has also been a reduction of the speed of the recording coating in front of the reading head. For this double reason, there has been a reduction in the intensity of the reading signal produced by a conductor winding.

In order to obviate this disadvantage, it has been proposed that use be made of a magnetoresistant element placed in or in the vicinity of the magnetic circuit in order to read the magnetic flux variations. This element is generally a ferromagnetic coating, usually of iron-nickel.

Figure 1:
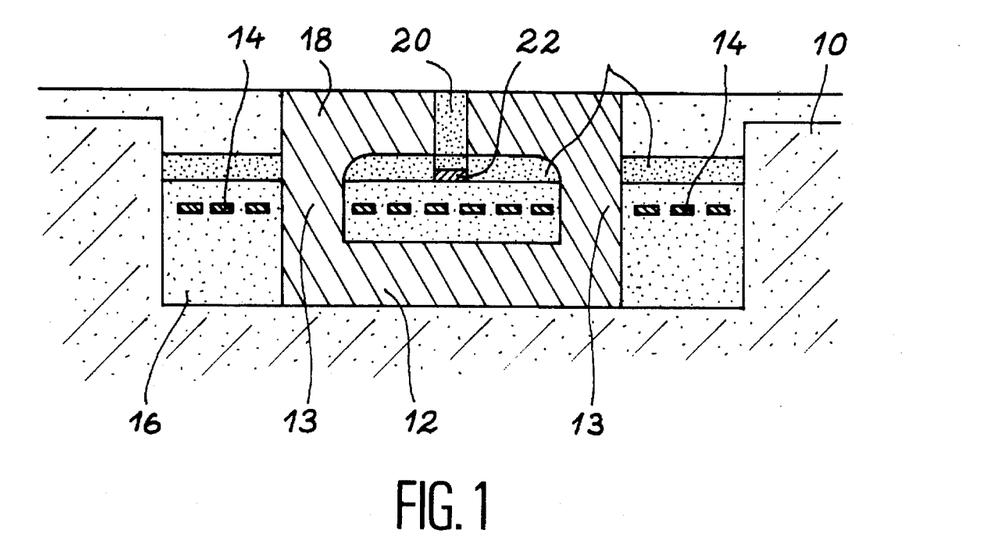
FIG. 1, already described, shows a planar head with magnetoresistance according to the prior art.

Such a magnetoresistant element head is described in French patent application FR-A-2,645,314. The attached FIG. 1 shows in section the essential means of a head of this type. As shown, the head comprises an e.g. silicon substrate 10, in which has been etched a recess. Electrolytic growth takes place in said recess of a horizontal magnetic coating 12, extended by two vertical posts 13. A write coil 14 is also formed and surrounds the posts 13, said coil being embedded in an insulating layer 16. A magnetoresistant element 22 is then formed, followed by an upper magnetic coating 18 with an amagnetic spacer 20. In such a head, the reading signal is sampled at the terminals of the magnetoresistant element 22.

Although satisfactory in certain respects, such devices suffer from disadvantages. Thus, the resistance variations of the magnetoresistant element are substantially quadratic, so that in order to obtain a linear response, it is necessary to apply to the magnetoresistant element a continuous magnetic field in order to polarize the magnetization of the ferromagnetic coating. Magnetization is generally at 45° from the current lines passing through the element. This requirement makes it more difficult to implement this reading means.

In addition, the reading signal sampled at the magnetoresistant element terminals is greatly disturbed by the changes of the magnetic state of the coating. Thus, the latter is often split into zones, which produce sudden magnetization variations when their walls are displaced or deform. These sudden variations lead to a significant noise in the reading signal.

Finally and more particularly, the thin magnetic film undergoes a variation in its characteristics as a function of the field to be detected. If the field applied is too high, the film is saturated and the sensitivity of the reading rapidly drops.

DESCRIPTION OF THE INVENTION

The present invention aims to obviate these disadvantages. For this purpose it recommends abandoning the prior art ferromagnetic magnetoresistant coatings in order to adopt another means sensitive to the magnetic field and in the form of a semiconductor sensor. Such sensors are naturally known per se, but not as reading means in a magnetic head. They can be HALL cells, magnetodiodes, magnetotransistors, etc.

Such a detector, e.g. a HALL probe could be placed in a gap especially made in the magnetic circuit of a head. However, this would be a complex procedure requiring mechanical assembly, bonding, etc. and would only apply in the case of solid magnetic circuits (e.g. of mumetal).

The present invention proposes the use of such sensors in thin film reading heads and in particular in planar heads on silicon.

Therefore the present invention proposes a process for the production of a planar magnetic head with a silicon substrate, in which the first stage is to produce a semiconductor sensor, which requires the use of high temperatures and then around said sensor is formed the magnetic circuit of the head. Therefore the sensor is not joined to the head, being instead integrated therewith.

More specifically, the present invention relates to a process for the production of a magnetic reading head, characterized in that it comprises the following operations:

starting with a silicon substrate, in a first phase at least one magnetic field sensitive semiconductor sensor is produced on one face of said substrate, in a second phase formation takes place on the same substrate face and around the sensor o a magnetic circuit incorporating a lower magnetic coating parallel to the substrate, two magnetic posts perpendicular to the substrate and an upper magnetic coating parallel to the substrate, bearing on the two posts and having a head gap.

Two variants are provided, depending on whether the sensor is sensitive to a perpendicular or to a parallel magnetic field.

According to a simple embodiment only one sensor is produced, although two can be produced.

The process according to the invention more particularly aims at producing a magnetic reading head. However, it can be completed by the formation of a conductor winding in order to obtain a head, which also functions in writing.

The present invention also relates to a magnetic head, which is obtained by the process defined hereinbefore.

DETAILED DESCRIPTION OF THE EMBODIMENTS

Figure 2A:
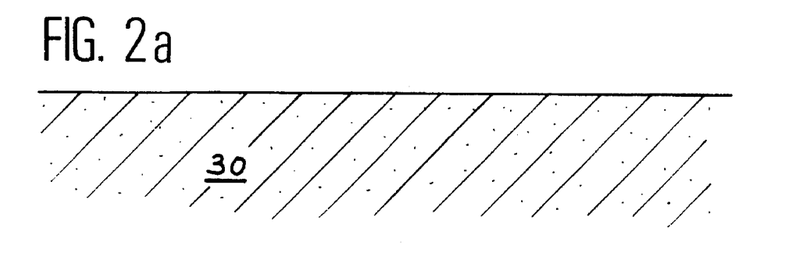
FIGS. 2a to 2i illustrate different phases in the production of a magnetic head according to a variant of the invention.
Figure 2B:
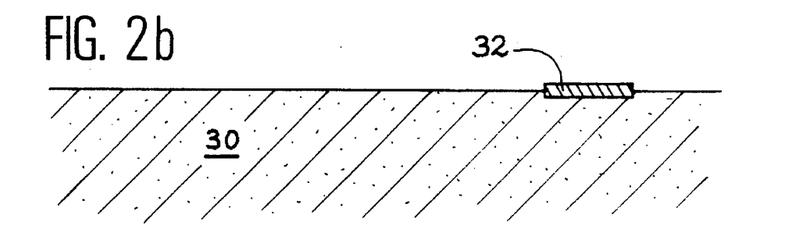
Figure 2C:
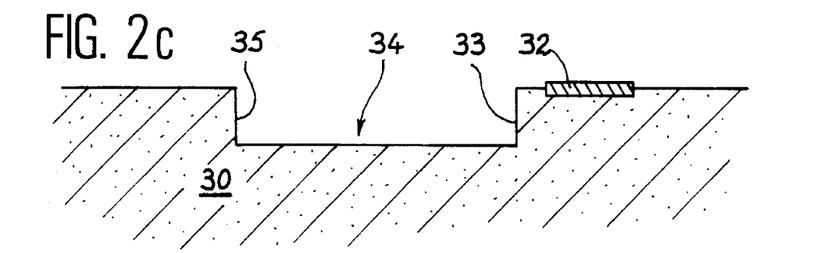

FIGS. 2a to 2i illustrate different stages of a first variant for the performance of the process in which production takes place of a single semiconductor sensor sensitive to a magnetic field parallel to the plane of the sensor. The first stage is a monocrystalline silicon substrate 30 (FIG. 2a) on whose upper face is deposited a semiconductor sensor 32 (FIG. 2b). A recess 34 is then formed in the substrate 30 with a first end 33 located in the vicinity of the sensor 32 and another end 35 remote from said sensor 32 (FIG. 2c).

Figure 2D:
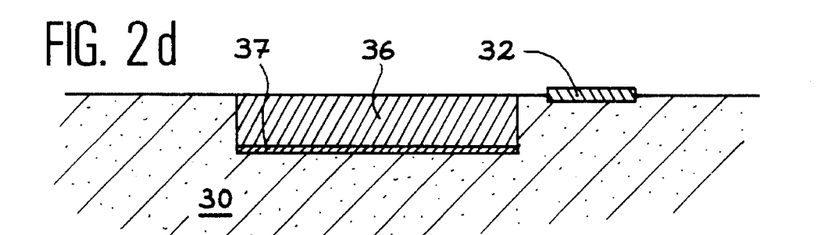

In the said recess 34 is formed the lower magnetic coating 36 (FIG. 2d). For this purpose and in accordance with a known process, it is possible to deposit a metal coating 37 at the bottom of the recess and electrolytically grow the coating 36 using the coating 37 as the electrode.

Figure 2E:
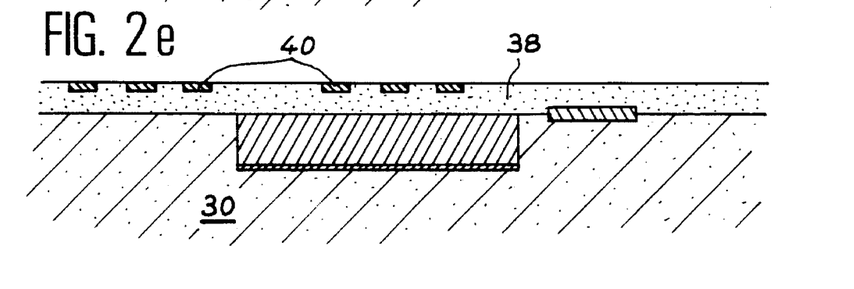

In the case where it is wished to obtain not only a read head, but also a write head, a conductor winding is formed by depositing an insulating coating 38, e.g. of silica, by etching a spiral in said coating and filling said spiral with a metal. Thus, a spiral winding 40 is obtained, which is preferably closed on the side opposite to the sensor 32 (FIG. 2e).

Figure 2F:
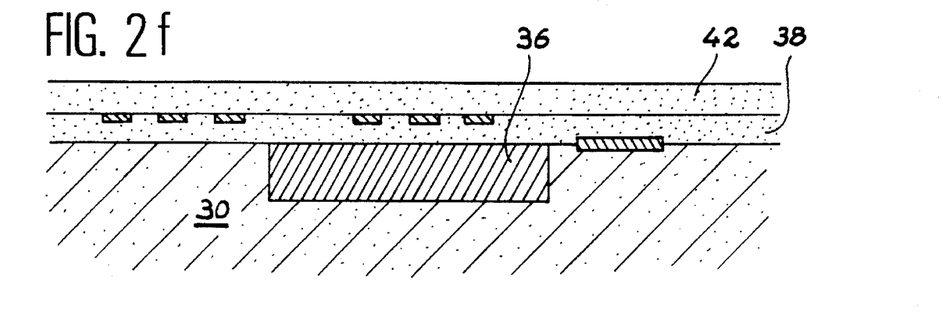

This is followed by the deposition of a second insulating coating 42, e.g. of silica, in order to completely bury the winding 40 ( FIG. 2f).

Figure 2G:
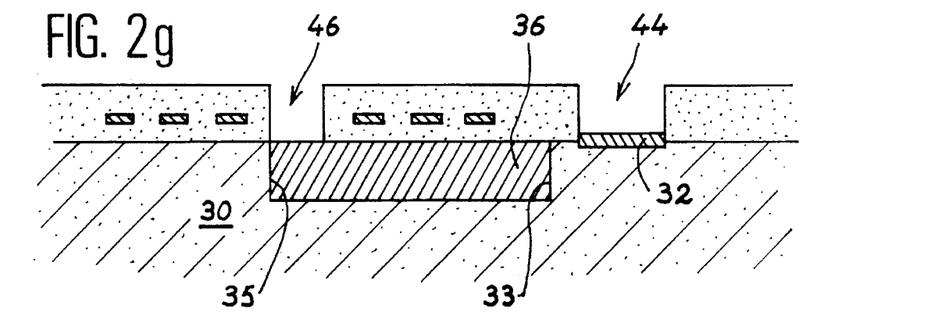

Two openings 44,46 are etched in the insulators 38,42, the first above the sensor 32 and the second above the end 35 of the lower magnetic coating 36 (FIG. 2g).

Figure 2H:
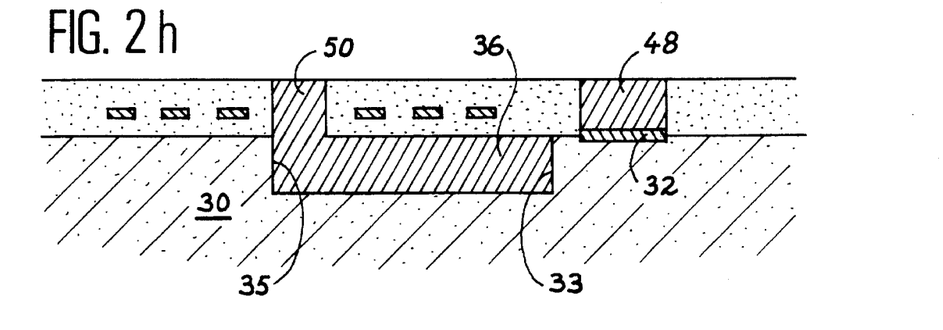

For example, using electrolytic growth, formation then takes place of a first magnetic post 48 on the sensor 32 and a second magnetic post 50 on the end 35 of the magnetic coating (FIG. h).

Figure 2I:
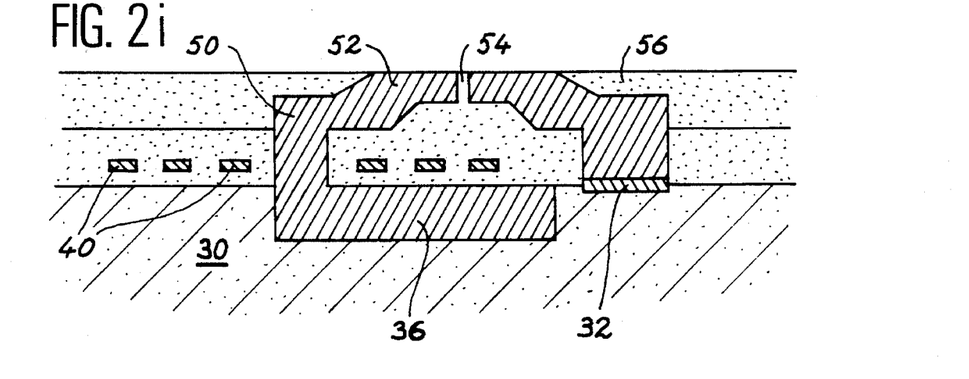

On these two posts 48,50 is finally produced the upper magnetic coating 52 with its head gap 54 (FIG. 2i).

Figure 3:
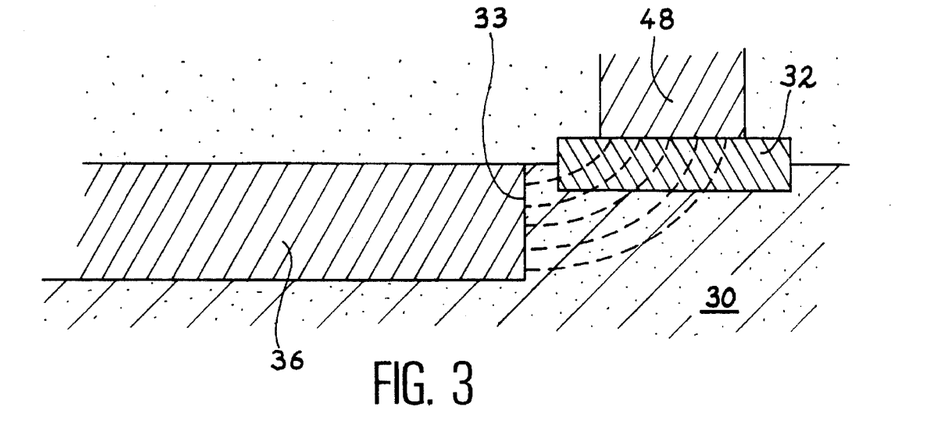
FIG. 3 diagrammatically shows the passage through the sensor of field lines in a variant having a vertical field sensitive sensor.

FIG. 3 shows in greater detail the zone of the sensor. The broken lines illustrate the magnetic field lines between the end 33 of the coating 36 and the magnetic post 48. FIG. 3 shows that the sensor is traversed by field lines which, without being strictly perpendicular to the sensor plane, have a very significant perpendicular component.

Figure 4A:
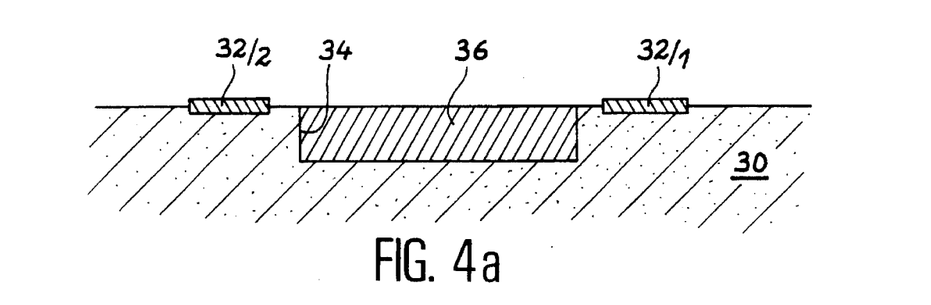
FIGS. 4a and 4b illustrate a variant with two sensors.
Figure 4B:
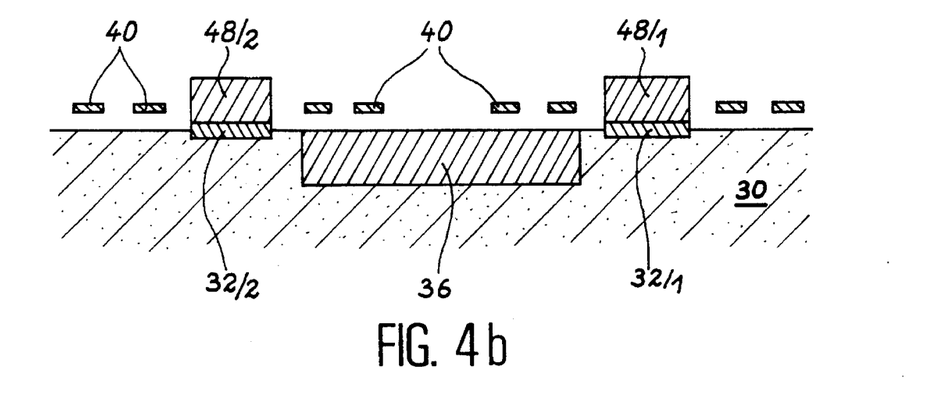

FIGS. 4a and 4b illustrate a variant with two sensors. In this case, the process comprises the following essential operations:

on the upper face of the substrate 30 are formed two sensors 32/1, 32/2, which are spaced from one another, a recess 34 is formed in the substrate between the two sensors 32/1, 32/2, the lower magnetic coating 36 is formed in said recess 34 (FIG. 4a).

By means of operations identical to those of FIGS. 2g and 2h, two magnetic posts 48/1, 48/22 are produced above the two sensors 32/1, 32/2 (FIG. 4b).

As in the previous embodiment, the head is completed by producing on the two magnetic posts 48/1, 48/2, the upper magnetic coating with its not shown head gap.

Figure 5A:
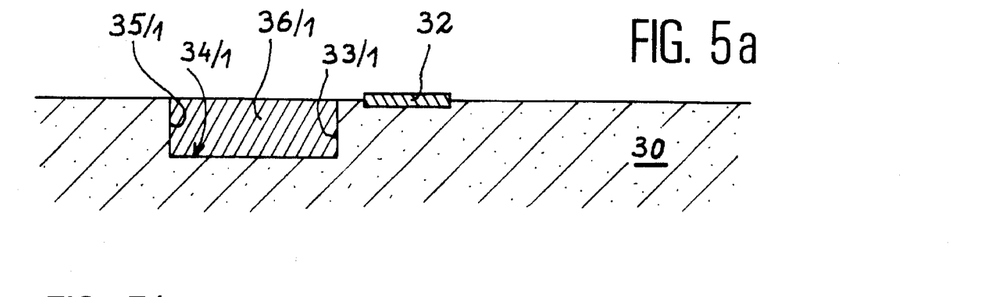
FIGS. 5a to 5d illustrate different phases in the production of a magnetic head according to a further variant of the invention.

FIGS. 5a to 5d illustrate a variant in which the sensor is positioned essentially in the centre of the lower magnetic layer instead of being located at one of its ends. In this variant:

a single sensor 32 is produced on the surface of the substrate 30, a first recess 34/1 is formed in the substrate 30 with a first end 33/1 located in the vicinity of the sensor 32 and a second end 35/1 remote from the sensor 32, in said first recess 34/1 is formed a first portion 36/1 of the lower magnetic coating (FIG. 5a).

Figure 5B:
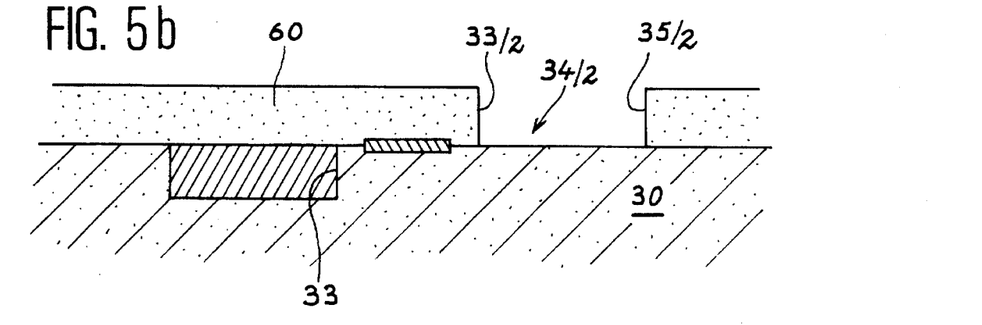

This is followed by the deposition of an insulating coating 60 and a second recess 34/2, symmetrical to the first with respect to the sensor 32 is etched. Said second recess has a first end 33/2 located close to the sensor and a second end 35/2 remote from the sensor (FIG. 5b).

Figure 5C:
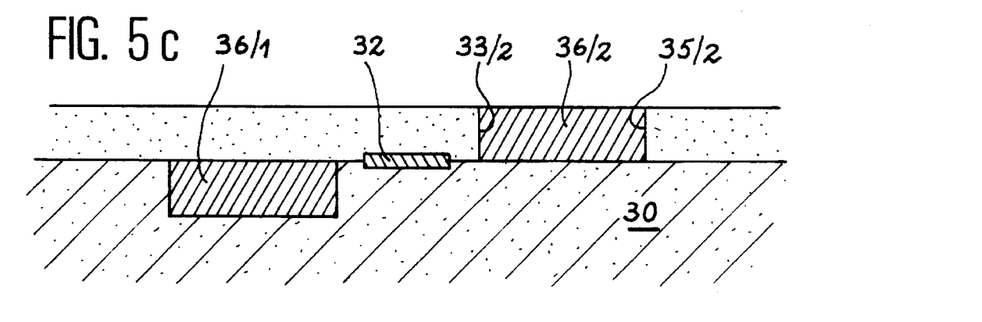
Figure 5D:
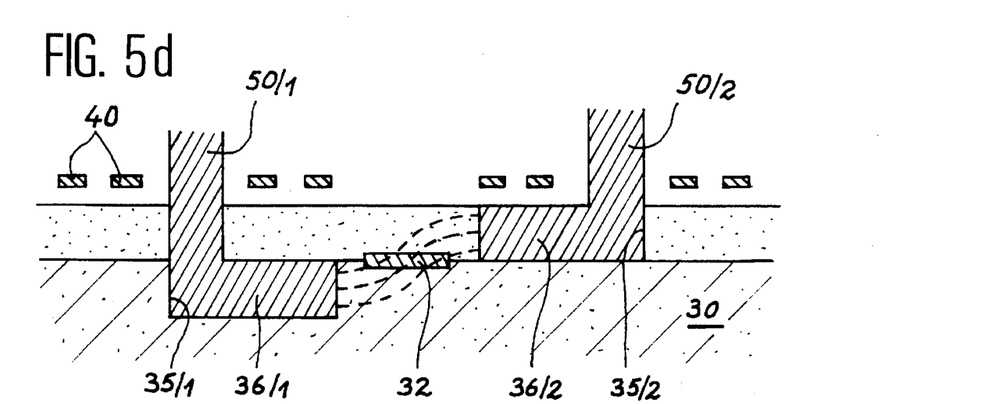

This is followed by the formation, e.g. by electrolytic growth, of the second portion 36/2 of the lower magnetic coating (FIG. 5c). Two magnetic posts 50/1, 50/2 are formed at the two ends 35/1, 35/2 remote from the sensor (FIG. 5d). On these two magnetic posts 50/1, 50/2 is then produced the upper magnetic coating with its not shown head gap.

In the two variants of FIGS. 4a/FIG. 4b on the one hand and FIG. 5a to 5d on the other, the conductor winding 40 can surround the magnetic posts due to the symmetry of the structure.

In the embodiments which have been illustrated hereinbefore, the semiconductor sensor operates with a magnetic field substantially perpendicular to the sensor plane. In the case of FIGS. 6a to 6d on the one hand and 7 on the other, the sensor operates with a magnetic field parallel to its plane. To obtain a magnetic head with such a sensor, the following procedure must be adopted.

Figure 6A:
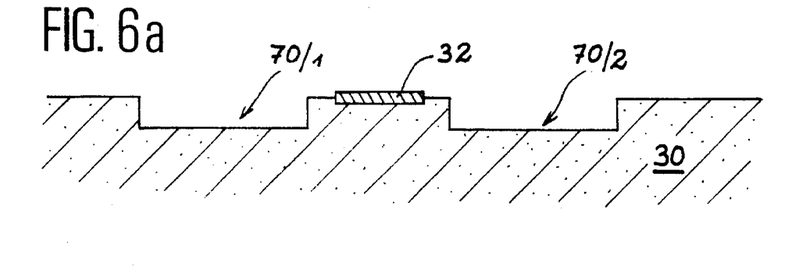
FIGS. 6a to 6d illustrate different phases in the production of a magnetic head according to another variant of the invention with a horizontal field sensitive sensor.

The first stage is to produce a horizontal sensor 32 on the silicon substrate 30. On either side of the sensor 32 are formed first and second recesses 70/1, 70/2 having a certain depth (FIG. 6a).

Figure 6B:
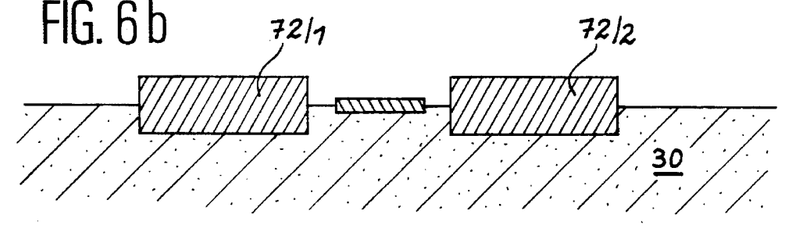
Figure 6C:
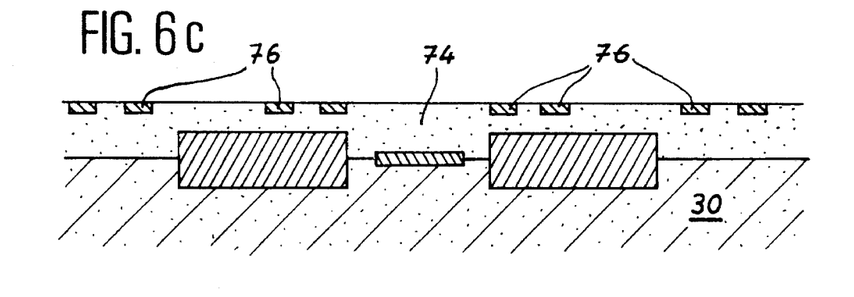

In said first and second recesses are formed first and second magnetic coatings, respectively 72/1, 72/2. Each of these coatings has a thickness which is twice the depth of the first and second recesses 70/1, 70/2 (FIG. 6b). An insulator 74 is then deposited on the assembly and a double spiral conductor winding 76 is formed (FIG. 6c).

Two openings are then made in the insulator 74 above the ends 77/1, 77/2 of the first and second coatings 72/1, 72/2 opposite to the sensor 32. In these openings are then formed two magnetic posts 80/1 and 80/2. The process is completed by the formation on said two magnetic posts 80/1, 80/2 of an upper magnetic coating 84 with its head gap 86 (FIG. 6d).

In this embodiment, the sensor 32 is enclosed by the two magnetic parts 72/1, 72/2 and it is located at mid-height. Thus, it is traversed by magnetic field lines passing horizontally from one part to the other (broken lines in FIG. 6d). Therefore it functions with a field parallel to its plane.

Figure 6D:
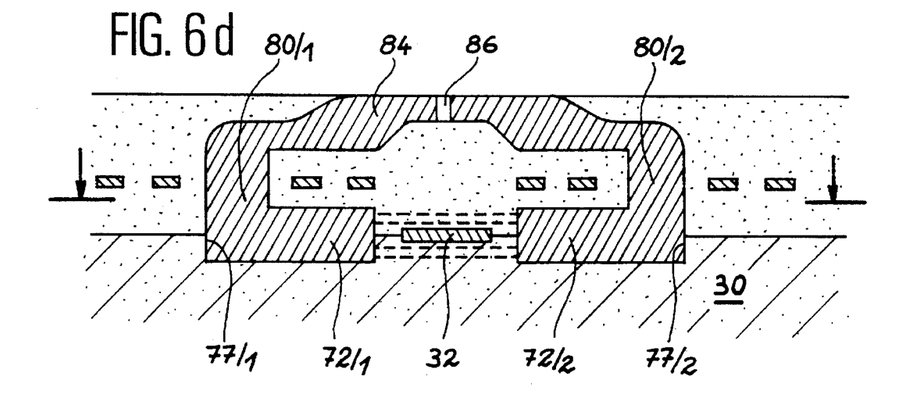
Figure 7:
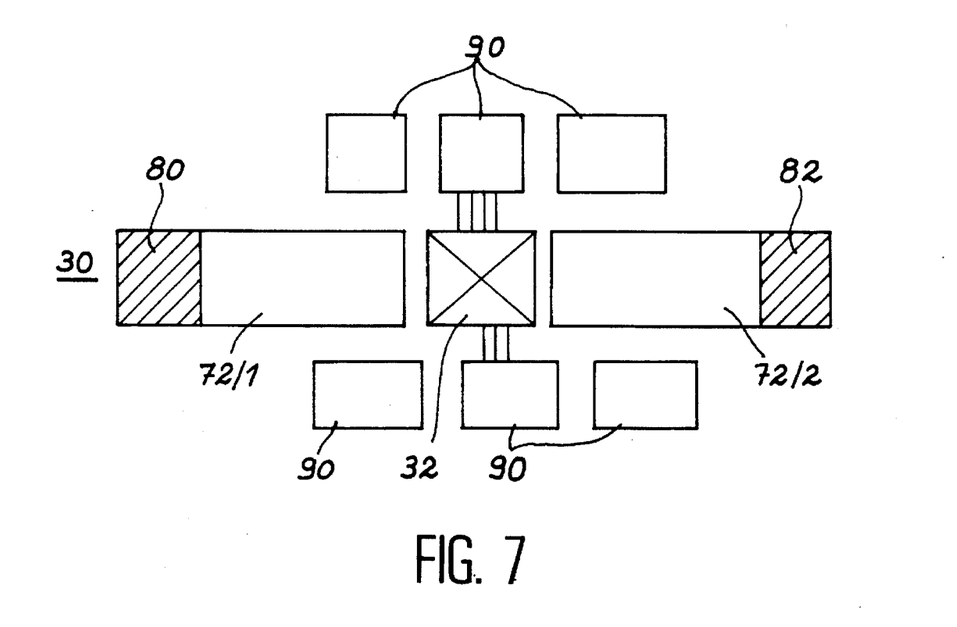
FIG. 7 shows in a plan view a subassembly with its sensor and its implementation means.

FIG. 7 is a plan view in accordance with the section indicated on FIG. 6d passing through the posts 80/1, 80/2. Sensor 32 is surrounded by various diagrammatically represented means 90 and which are power supply contacts, measurement contacts, polarizing circuits, etc.

The structure of a semiconductor sensor is described in greater detail in FIGS. 8 to 11. It is pointed out that each of the said devices per se is known. A description can be gathered from the following articles:

H. P. BALTES and R. S. POPOVIC "Integrated Semiconductor Magnetic-Field Sensor" Proc. IEEE, 74. (1986), pp. 1107–1132.

S. KORDIC "Integrated Silicon Magnetic-Field Sensors, Sensors and Actuators" Proc. IEEE, 10, (1986), pp. 347–378. J. E. LENZ "A Review of Magnetic Sensors". Proc. IEEE, 78 (1990), pp. 973–989.

S. TAKAMIYA and K. FUJIKAWA "Differential Amplification Magnetic Sensor" IEEE Trans. Electr. Dev. ED-19, (1972), pp. 1085–1090.

R. S. POPOVIC "The Vertical HALL-Effect Device" IEEE Electr. Dev. Lett. EDL-5, (1984), pp. 357–358.

In addition, these sensors were dealt with in a thesis submitted by Nathalie MATHIEU entitled "Study of sensors integrated on Si and GaAs for the detection of magnetic fields" submitted on Jul. 16, 1992 at the National Polytechnical Institute of Grenoble.

Figure 8:
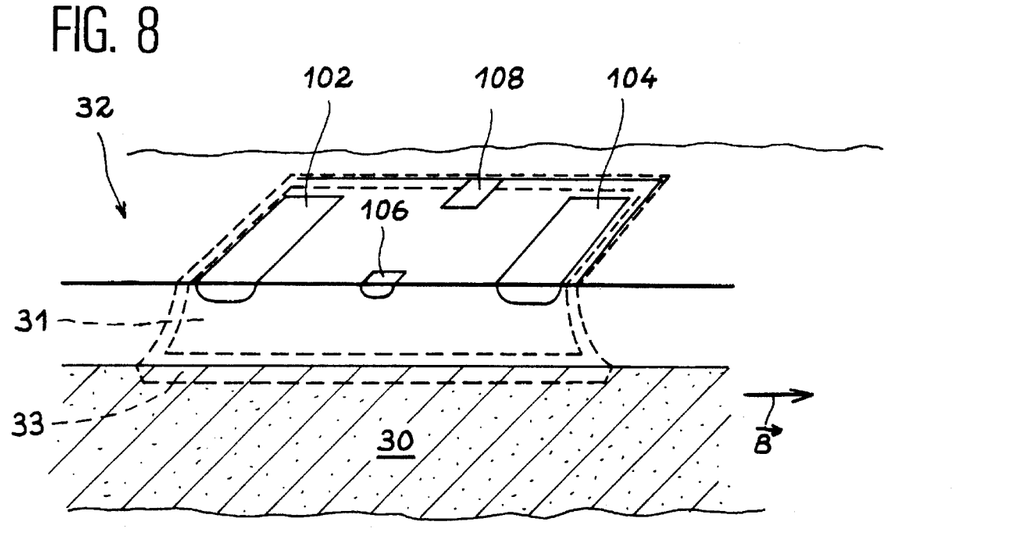
FIG. 8 illustrates a sensor of the HALL cell type in integrated bipolar technology.

FIG. 8 firstly shows a bipolar integrated technology Hall cell. There is a silicon substrate 30, of the P-type, with a N-type epitaxied coating 31. This coating is insulated by a depleted coating 33. The power supplies take place by two $N^+$-type contacts 102,104. The HALL voltage, which is the reading voltage supplied by the head, is sampled on the two $N^+$-doped lateral contacts 106,108.

According to the invention, it is also possible to use a HALL cell associated with a differential amplifier having two transistors also known as a differential amplification magnetic sensor (DAMS). The HALL region is then the common base of the transistors.

Figure 9:
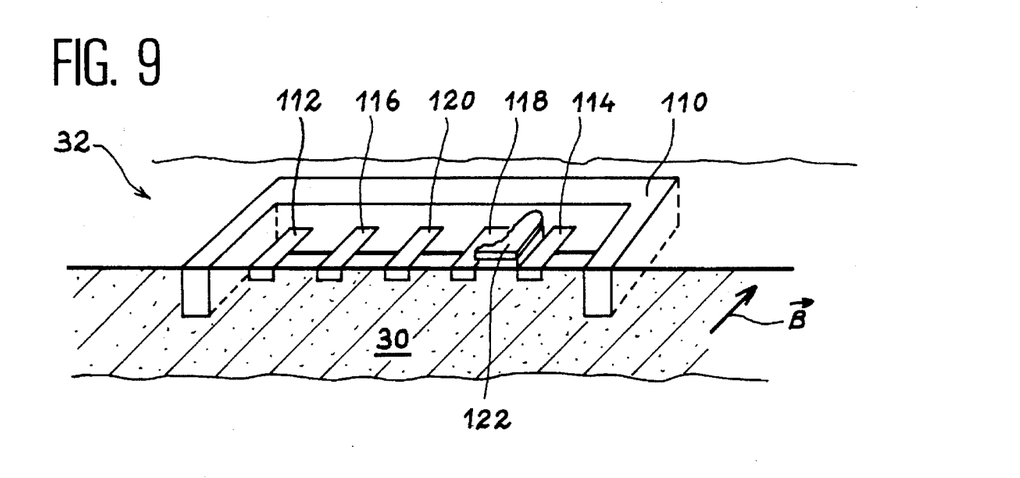
FIG. 9 illustrates another HALL cell-type sensor in a vertical configuration and in CMOS technology.

These sensors are sensitive to a field applied perpendicular to their plane. FIG. 9 shows a CMOS HALL cell, but which on this occasion is sensitive to a horizontal field. The substrate 30 is of N-type silicon and is surrounded by a P-type guard ring 110. It comprises $N^+$-type power supply contacts 112,114, grid contacts 116,118 and a central reading voltage sampling contact 120.

Figure 10:
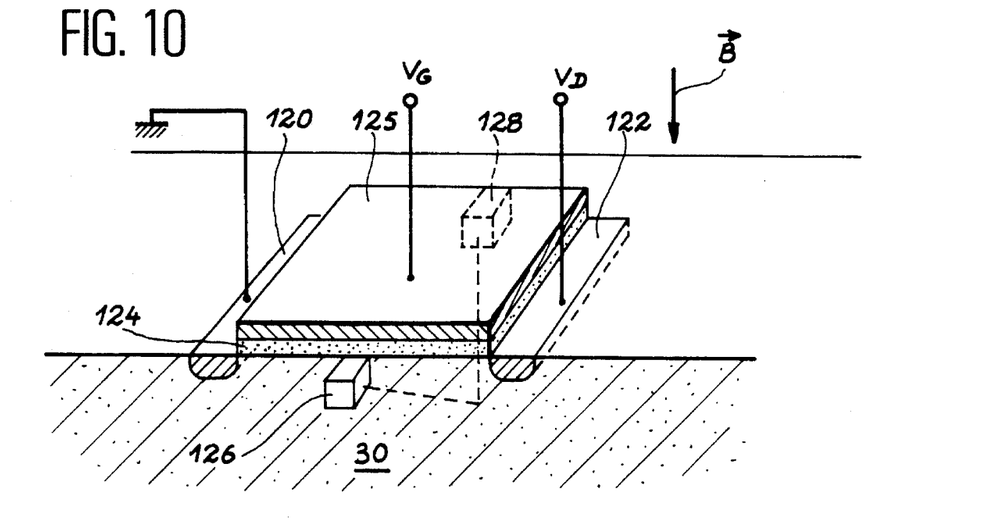
FIG. 10 illustrates a sensor of the magnetotransistor type having a N channel, MOS structure.
Figure 11:
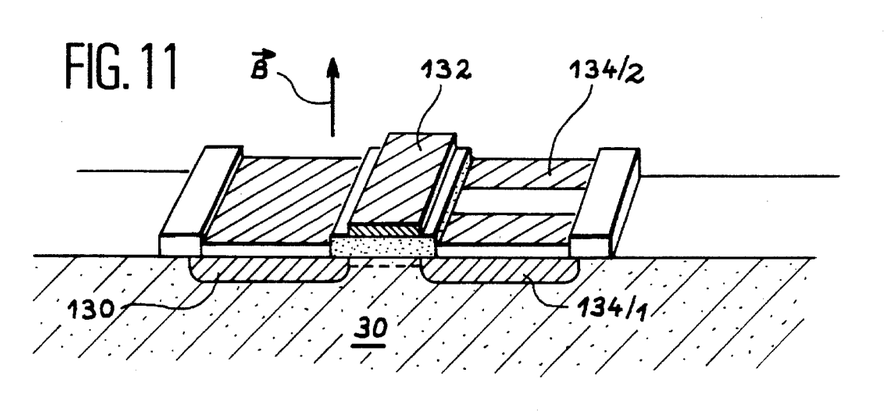
FIG. 11 illustrates a double drain magnetotransistor-type sensor.

FIGS. 10 and 11 relate to sensors of the magnetotransistor type. FIG. 10 firstly shows a N channel MOS structure. It is possible to see the P-type silicon substrate 30, a source 120 and a drain 122, both of the $N^+$ type, an insulating coating 124 and a conductive grid 125. It also comprises two $N^+$-doped lateral contacts 126 on which the reading voltage is sampled and which is a function of the magnetic field applied. This field is applied vertically.

In FIG. 11 the magnetotransistor once again has a $N^+$-doped source 130, a grid 132, but a drain split into two portions 134/1,134/2. When a magnetic field is applied perpendicular to the plane of the device, the symmetry of the drain current lines is broken. The useful signal is formed by the difference of the drain currents.

I claim:

1. Process for the production of a magnetic reading head, characterized in that it comprises the following operations:
   starting with a silicon substrate (30),
   in a first phase at least one magnetic field sensitive semiconductor sensor (32) is produced on one face of said substrate (30), in a second phase formation takes place on the same substrate face and around the sensor (32) of a magnetic circuit incorporating a lower magnetic coating (36,36/1,36/2,72/1,72/2) parallel to the substrate (30), two magnetic posts (48,50,80/1, 80/2) perpendicular to the substrate (30) and an upper magnetic coating (52,84) parallel to the substrate, being on the two posts and having a head gap (54,86).

2. Process according to claim 1, characterized in that production takes place of a semiconductor sensor (32) sensitive to a magnetic field directed substantially perpendicular to the substrate (30).

3. Process according to claim 2, characterized in that:
   a single sensor (32) is produced on the surface of the substrate (30),
   a recess (34) is formed in the substrate (30) with a first end (33) located in the vicinity of the sensor (32) and a second end (35) remote from the sensor (32),
   the lower magnetic coating (36) is formed in said recess (34), a first magnetic post (48) is formed on the sensor (32) and a second magnetic post (50) on the end (35) of the lower magnetic coating remote from the sensor (32),
   on said two posts (48,50) is formed the upper magnetic coating (52) with its head gap (54).

4. Process according to claim 2, characterized in that:
   two spaced sensors (32/1,32/2) are formed on the face of the substrate (30),
   a recess (34) is formed in the substrate between the two sensors (32/1,32/2),
   the lower magnetic coating (36) is formed in said recess (34),
   two magnetic posts (48/1,48/2) are produced above the two sensors (32/1,32/2),
   the upper magnetic coating (52) with its head gap (54) is produced on these two magnetic posts (48/1,48/2).

5. Process according to claim 2, characterized in that:
   a single sensor (32) is produced on the surface of the substrate (30),
   a recess (34/1) is formed in the substrate (30) with a first end (33/1) located in the vicinity of the sensor (32) and a second end (35/1) remote from the sensor (32),
   in said first recess (34/1) is formed a first portion (36/1) of the lower magnetic coating,
   on the substrate (30) and symmetrically of said first portion (36/1) with respect to the sensor (32) is formed a second portion (36/2) of the lower magnetic coating, with a first end (33/2) in the vicinity of the sensor (32) and a second end (35/2) remote from the sensor (32),
   two magnetic posts (50/1,50/2) are formed at the two ends (35/1, 35/2) remote from the sensor of the first (36/1) and the second (36/2) portions of the lower magnetic coating,
   on said two magnetic posts (50/1,50/2) is produced the upper magnetic coating (52) with its head gap (54).

6. Process according to any one of the claims 2 to 5, characterized in that a HALL cell-type sensor is produced by starting with a P-type silicon substrate (30) and forming in said substrate (30) a N-type coating (31), forming two first contacts (102,104) for the power supplies and two second contacts (106, 108) for collecting a reading voltage.

7. Process according to claim 6, characterized in that the HALL cell sensor also comprises a differential amplification magnetic sensor.

8. Process according to any one of the claims 2 to 5, characterized in that on the P-doped silicon substrate (30) is produced a HALL field effect, MOS magnetotransistor-type sensor with a $N^+$-doped source (120), a $N^+$-doped drain (122), an insulating coating (124) and a conductive grid (125).

9. Process according to claim 8, characterized in that the magnetotransistor comprises two lateral contacts (126,128)

on either side of the channel (124).

10. Process according to claim 8, characterized in that a two drain magnetotransistor (134/1,134/2) is produced.

11. Process according to any one of the claims 2 to 5, characterized in that a bipolar magnetotransistor-type sensor is produced.

12. Process according to claim 11, characterized in that the magnetotransistor is of the lateral type.

13. Process according to claim 1, characterized in that a semiconductor sensor (32) sensitive to a magnetic field parallel to the plane of the substrate (30) on which it is formed is produced.

14. Process according to claim 13, characterized in that:

a single sensor (32) is produced on the substrate (30), on either side of the sensor (32) is formed a first and a second (70/1, 70/2) each having a depth, in said first (70/1) and said second (70/2) recesses are formed a first (72/1) and a second (72/2) magnetic coatings each having a thickness which is twice the depth of the first and second recesses (70/1,70/2), on the ends (77/1,77/2) of the first and second coatings (72/1, 72/2) opposite to the sensor (32) are formed two magnetic posts (80/1,80/2), on said two magnetic posts (80/1,80/2) is produced the upper magnetic coating (84) with its head gap (86).

15. Process according to either of the claims 13 and 14, characterized in that a vertical MOS HALL-type sensor is produced.

16. Process according to either of the claims 13 and 14, characterized in that a vertical magnetotransistor-type sensor is produced.

17. Process for the production of a magnetic read-write head, characterized in that it comprises the operations of the process according to any one of the claims 1 to 16 additionally with an operation of producing a conductor winding (40) buried in an insulating material (38,42), said winding (40) surrounding at least one of the two magnetic posts (48,50,80/1,80/2).

* * * * *